US008320283B2

United States Patent
Kim (10) Patent No.: US 8,320,283 B2
(45) Date of Patent: *Nov. 27, 2012

(54) METHOD AND SYSTEM FOR UTILIZING GIVENS ROTATION EXPRESSIONS FOR ASYMMETRIC BEAMFORMING MATRICES IN EXPLICIT FEEDBACK INFORMATION

(75) Inventor: Joonsuk Kim, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,905

(22) Filed: Jun. 27, 2012

(65) Prior Publication Data

US 2012/0275538 A1 Nov. 1, 2012

Related U.S. Application Data

(63) Continuation of application No. 11/327,690, filed on Jan. 6, 2006, now Pat. No. 8,233,552.

(60) Provisional application No. 60/734,514, filed on Nov. 7, 2005.

(51) Int. Cl.
H04W 4/00 (2009.01)
H04K 1/00 (2006.01)

(52) U.S. Cl. ........................................ 370/260; 370/338

(58) Field of Classification Search .......... 455/436–444, 455/448, 417, 69; 375/260, 267, 229; 370/332, 370/338, 344, 347
See application file for complete search history.

(56) References Cited

U.S. PATENT DOCUMENTS

2006/0020428 A1* 1/2006 Baxter et al. ................. 702/189
2006/0039489 A1* 2/2006 Ikram et al. .................. 375/260
* cited by examiner

*Primary Examiner* — Michael Faragalla
(74) *Attorney, Agent, or Firm* — Garlick & Markison; Holly L. Rudnick (57) ABSTRACT

Aspects of a method and system for utilizing Givens rotation expressions for asymmetric beamforming matrices in explicit feedback information are presented. In one aspect of the invention, Givens matrices may be utilized to reduce a quantity of information communicated in explicit feedback information via an uplink RF channel. The explicit feedback information may include specifications for a feedback beamforming matrix that may be utilized when transmitting signals via a corresponding downlink RF channel. The feedback beamforming matrix may represent a rotated version of an un-rotated matrix. The Givens matrices may be utilized to apply one or more Givens rotations to un-rotated matrix. The feedback beamforming matrix may be computed based on a matrix product of a plurality of Givens matrices. The feedback beamforming matrix may be encoded utilizing fewer bits than may be required to encode the un-rotated matrix.

20 Claims, 5 Drawing Sheets

METHOD AND SYSTEM FOR UTILIZING GIVENS ROTATION EXPRESSIONS FOR ASYMMETRIC BEAMFORMING MATRICES IN EXPLICIT FEEDBACK INFORMATION

CROSS REFERENCE TO PRIORITY APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. application Ser. No. 11/327,690, entitled, "Method and System for Utilizing Givens Rotation Expressions for Asymmetric Beamforming Matrices in Explicit Feedback Information," filed Jan. 6, 2006, pending, which claims priority pursuant to 35 U.S.C. §119(e) the following U.S. Provisional Patent Application which is hereby incorporated herein by reference in its entirety and made part of the present U.S. Utility Patent Application for all purposes:
    a. U.S. Provisional Application Ser. No. 60/734,514, entitled, "Method and System for Givens Rotation Expression for Asymmetric Beamforming Matrix in the Explicit Feedback," filed Nov. 7, 2005.

CROSS REFERENCE TO RELATED APPLICATIONS

This application makes reference to:
U.S. application Ser. No. 11/327,752 filed Jan. 6, 2006; and
U.S. application Ser. No. 11/052,389 filed Feb. 7, 2005.

FIELD OF THE INVENTION

Certain embodiments of the invention relate to wireless communications. More specifically, certain embodiments of the invention relate to a method and system for utilizing Givens rotation expressions for asymmetric beamforming matrices in explicit feedback information.

BACKGROUND OF THE INVENTION

Multiple input multiple output (MIMO) systems are wireless communications systems are specified in resolution 802.11 from the Institute of Electrical and Electronics Engineers (IEEE). A MIMO system that receives a signal Y may compute a channel estimate matrix, H, based on the received signal. The signal may comprise information generated from a plurality of information sources. Each such information source may be referred to as a spatial stream. A transmitting MIMO system may utilize a plurality of transmitting antennas when transmitting the signal Y. A receiving MIMO system may utilize a plurality of receiving antennas when receiving the signal Y. The channel estimate matrix for a downlink RF channel, $H_{down}$, may describe a characteristic of the wireless transmission medium in the transmission path from a transmitter, to a receiver. The channel estimate for an uplink RF channel, $H_{up}$, may describe a characteristic of the wireless transmission medium in the transmission path from the receiver to the transmitter.

According to the principle of reciprocity, a characteristic of the wireless transmission medium in the transmission path from the transmitter to the receiver may be assumed to be identical to a corresponding characteristic of the wireless transmission medium in the transmission path from the receiver to the transmitter. However, the channel estimate matrix $H_{down}$ may not be equal to a corresponding channel estimate matrix for an uplink RF channel $H_{up}$. For example, a noise level, for example an ambient noise level, in the vicinity of the transmitter may differ from a noise level in the vicinity of the receiver. Similarly, an interference level, for example electro-magnetic interference due to other electro-magnetic devices, in the vicinity of the transmitter may differ from an interference level in the vicinity of the receiver. At a transmitter, or receiver, there may also be electrical cross-coupling, for example leakage currents, between circuitry associated with a receiving antenna, or a transmitting antenna, and circuitry associated with another receiving antenna, or another transmitting antenna.

The principle of reciprocity, wherein it may be assumed that $H_{up}=H_{down}$, may also be based on the assumption that specific antennas at a transmitter or receiver are assigned for use as transmitting antennas, and/or assigned for use as receiving antennas. At the transmitter, a number of receiving antennas, NRX, utilized at the receiver may be assumed. At the receiver, a number of transmitting antennas, NTX, utilized at the transmitter may be assumed. If the assignments of at least a portion of the antennas at the transmitter are changed, the corresponding channel estimate matrix $H'_{up}$ may not be equal $H_{down}$. Similarly, if the assignments of at least a portion of the antennas at the receiver are changed, the corresponding channel estimate matrix $H'_{down}$ may not be equal $H_{up}$. Consequently, after reassignment of antennas at the transmitter and/or receiver, the principle of reciprocity may not be utilized to characterize communications between the transmitter and the receiver when $H_{up}$ does not equal $H'_{down}$, when $H'_{up}$ does not equal $H_{down}$, or when $H'_{up}$ does not equal $H'_{down}$.

The principle of reciprocity may enable a receiving wireless local area network (WLAN) device A to receive a signal Y from a transmitting WLAN device B, and to estimate a channel estimate matrix $H_{down}$ for the transmission path from the transmitting WLAN device B to the receiving WLAN device A. Based on the channel estimate matrix $H_{down}$, the WLAN device A may transmit a subsequent signal Y, via an uplink RF channel, to the WLAN device B based on the assumption that the channel estimate matrix $H_{up}$ for the transmission path from the transmitting WLAN device A to the receiving WLAN device B may be characterized by the relationship $H_{up}=H_{down}$. When the WLAN devices A and B are MIMO systems, corresponding beamforming matrices may be configured and utilized for transmitting and/or receiving signals at each WLAN device.

Beamforming is a method for signal processing that may allow a transmitting MIMO system to combine a plurality of spatial streams in a transmitted signal Y. Beamforming is also a method for signal processing that may allow a receiving MMO system to separate individual spatial streams in a received signal Y.

As a result of a failure of an assumed condition for the principle of reciprocity, a beamforming matrix at the transmitting WLAN device, and/or a beamforming matrix at the receiving WLAN device, may be configured incorrectly. In a transmitted signal Y, from the perspective of a signal associated with an $i^{th}$ spatial stream, a signal associated with a $j^{th}$ spatial stream may represent interference or noise. Incorrect configuration of one or more beamforming matrices may reduce the ability of the receiving WLAN device to cancel interference between an $i^{th}$ spatial stream and a $j^{th}$ spatial stream. Consequently, the received signal Y may be characterized by reduced signal to noise ratios (SNR). There may also be an elevated packet error rate (PER) when the receiving WLAN device decodes information contained in the received signal Y. This may, in turn, result in a reduced information transfer rate, as measured in bits/second, for communications between the transmitting WLAN device and the receiving WLAN device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for utilizing Givens rotation expressions for asymmetric beamforming matrices in explicit feedback information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for utilizing Givens rotation expressions for asymmetric beamforming matrices in explicit feedback information. In one aspect of the invention, Givens matrices may be utilized to reduce a quantity of information communicated in explicit feedback information via an uplink RF channel. The explicit feedback information may comprise specifications for a feedback beamforming matrix that may be utilized when transmitting signals via a corresponding downlink RF channel. The feedback beamforming matrix may represent a rotated version of an un-rotated beamforming matrix. The Givens matrices may be utilized to apply one or more Givens rotations to un-rotated beamforming matrix. The feedback beamforming matrix may be computed based on a matrix product of a plurality of Givens matrices. The feedback beamforming matrix may comprise comparable information content to the un-rotated beamforming matrix. The feedback beamforming matrix may be encoded utilizing fewer bits than may be required to encode the un-rotated beamforming matrix. Various embodiments of the invention may be utilized in wireless communications systems, including wireless data communications systems.

Explicit feedback may be utilized to reduce the likelihood that signals Y will be transmitted incorrectly during beamforming. Explicit feedback comprises a mechanism by which a receiving WLAN device A may compute a channel estimate matrix $H_{down}$. The computed channel estimate matrix may be utilized to compute feedback information that may be utilized by the WLAN device B to configure a beamforming matrix associated with the downlink RF channel. The feedback information may be communicated from the WLAN device A to the WLAN device B via the uplink RF channel. The feedback information may comprise a full description of the downlink RF channel. A full description of the downlink RF channel may comprise a frequency channel estimate for each subcarrier frequency associated with each spatial stream contained in the downlink RF channel. Each frequency channel estimate may be characterized in a Cartesian coordinate format, or in a polar coordinate format. In the Cartesian coordinate format, each frequency channel estimate may be represented by an in-phase (I) amplitude component, and a quadrature (Q) phase amplitude component. In the polar coordinate format, each frequency channel estimate may be represented by a magnitude ($\rho$) component, and an angle ($\theta$) component.

In some conventional systems, a large quantity of feedback information may be communicated in the feedback direction. RF channel bandwidth that is dedicated for use in communicating feedback information may reduce the quantity of other types of information that may be communicated between the WLAN device A and the WLAN device B within a given time interval. The feedback information may be referred to as overhead within the uplink RF channel. The overhead may reduce the information transfer rate between the WLAN device A and the WLAN device B associated with non-feedback information.

Figure 1:
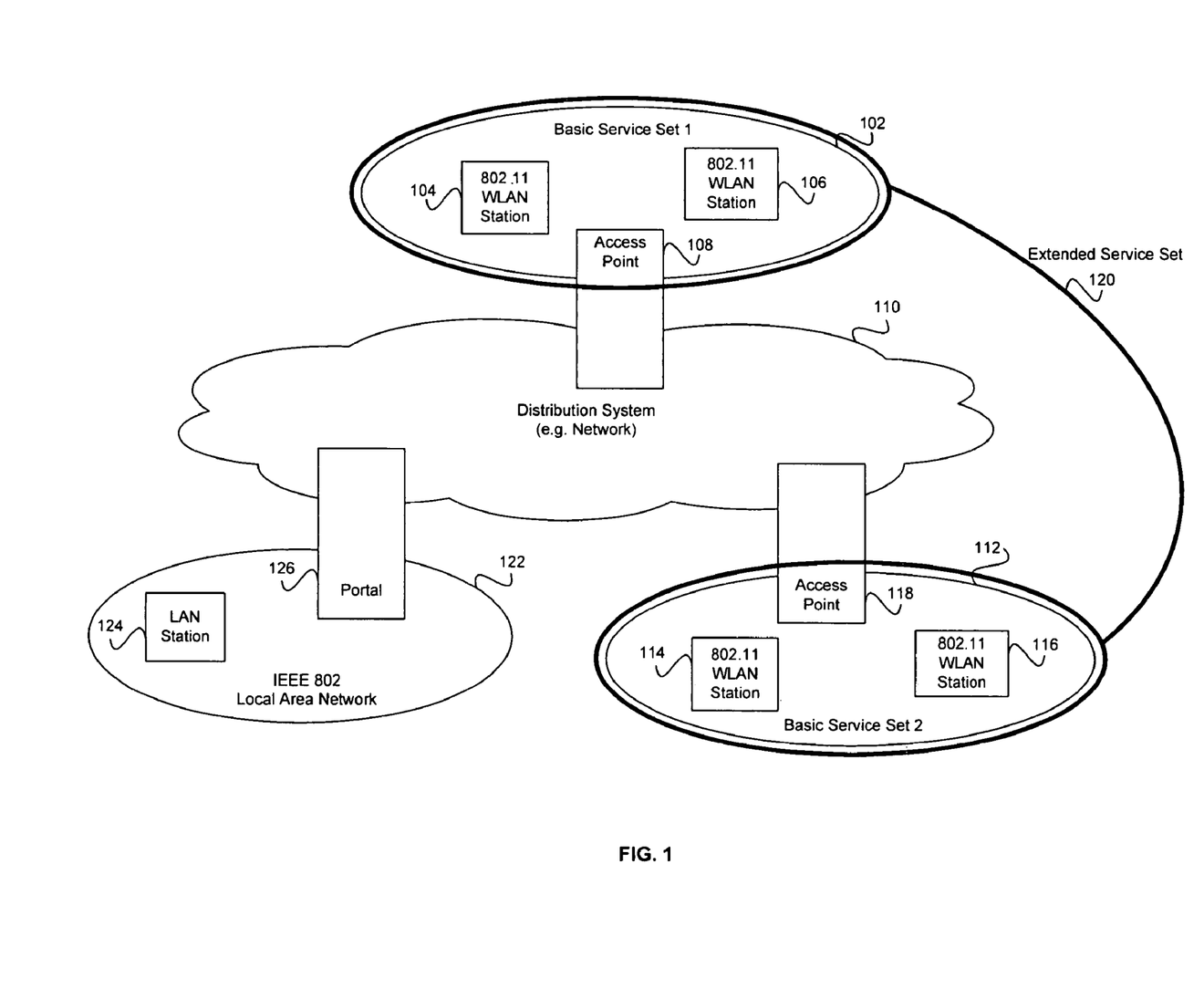
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1 there is shown a distribution system (DS) 110, an extended service set (ESS) 120, and an IEEE 802.x LAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 may comprise a LAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN 122 such as the 802 LAN station 124. The communication of reachability information about the first 802.11 WLAN station 104 may enable WLAN stations that are not in BSS 102, but are associated with ESS 120, to communicate wirelessly with the first 802.11 WLAN station 104.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN station 124 in an IEEE 802 LAN 122, implemented as, for example a wired LAN. The AP 108, AP 118, or portal 126 may provide a means by which a station in a BSS 102, BSS 112, or LAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN station 124 in LAN 122 by transmitting the information wirelessly to AP 108, which may transmit the information via the DS 110 to the portal 126, which in turn may transmit the information to the 802 LAN station 124 in LAN 122. The DS 110 may utilize wireless communications via an RF channel, wired communications, such as IEEE 802 Ethernet, or a combination thereof.

A WLAN station or AP may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
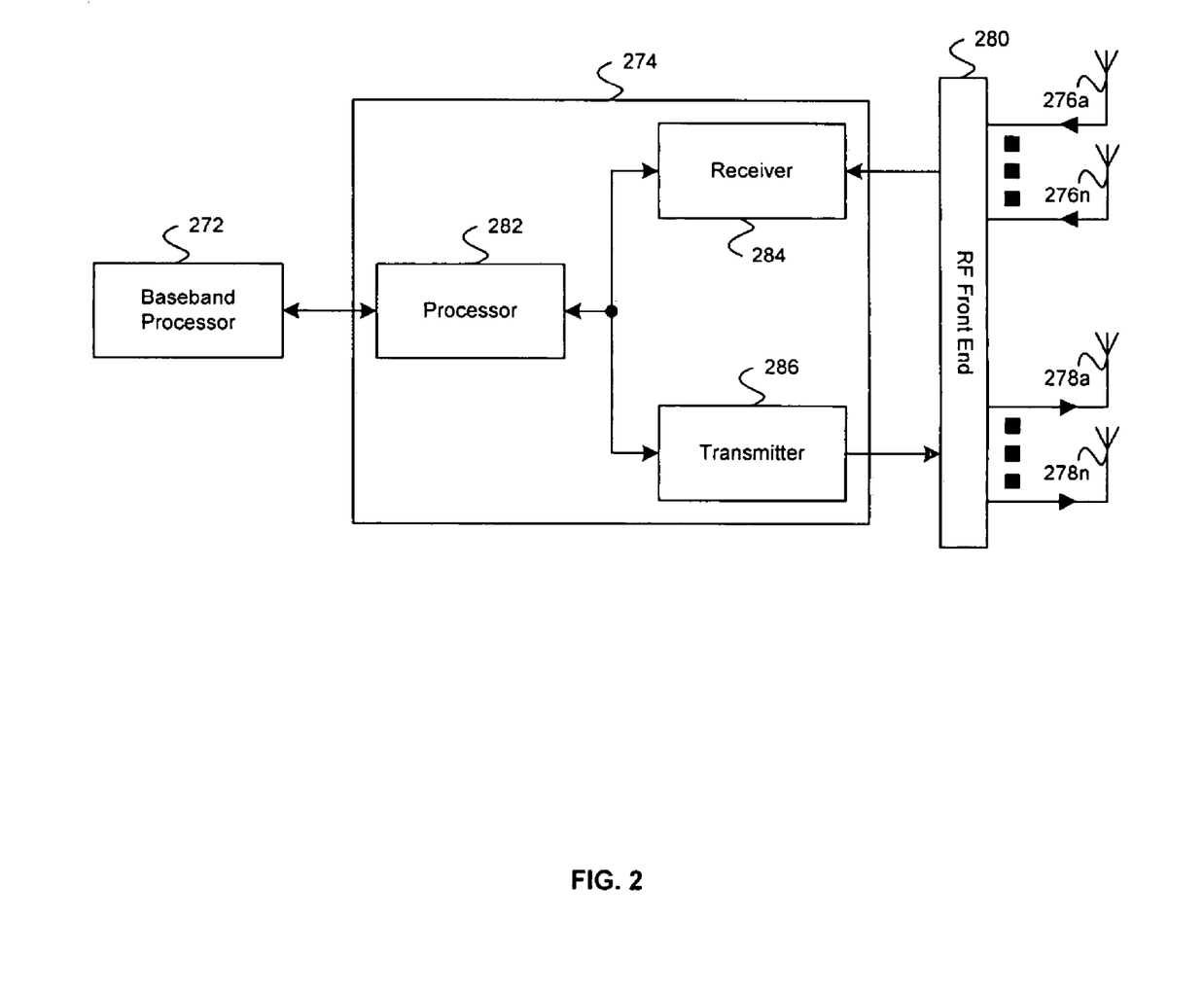
FIG. 2 is a block diagram of an exemplary MIMO system that may be utilized in connection with an embodiment of the invention.

FIG. 2 is a block diagram of an exemplary MIMO system that may be utilized in connection with an embodiment of the invention. With reference to FIG. 2 there is shown a baseband processor 272, a transceiver 274, an RF front end 280, a plurality of receiving antennas 276a, ..., 276n, and a plurality of transmitting antennas 278a, ..., 278n. The transceiver 274 may comprise a processor 282, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 272 may perform functions in accordance with applicable communications standards. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards.

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, ..., 276n, converting the RF signal to baseband and generating a digital equivalent of the received analog baseband signal. The digital representation may be a complex quantity comprising I and Q components. The RF front end 280 may also transmit analog RF signals via an antenna 278a, ..., 278n, converting a digital baseband signal to an analog RF signal.

In operation, the processor 282 may receive data from the receiver 284. The processor 282 may communicate received data to the baseband processor 272 for analysis and further processing. The baseband processor 272 may generate data to be transmitted via an RF channel by the transmitter 286. The baseband processor 272 may communicate the data to the processor 282. The processor 282 may generate a plurality of bits that are communicated to the receiver 284. The processor 282 may generate signals to control the operation of the modulation process in the transmitter 286, and of the demodulation process in the receiver 284.

Figure 3:
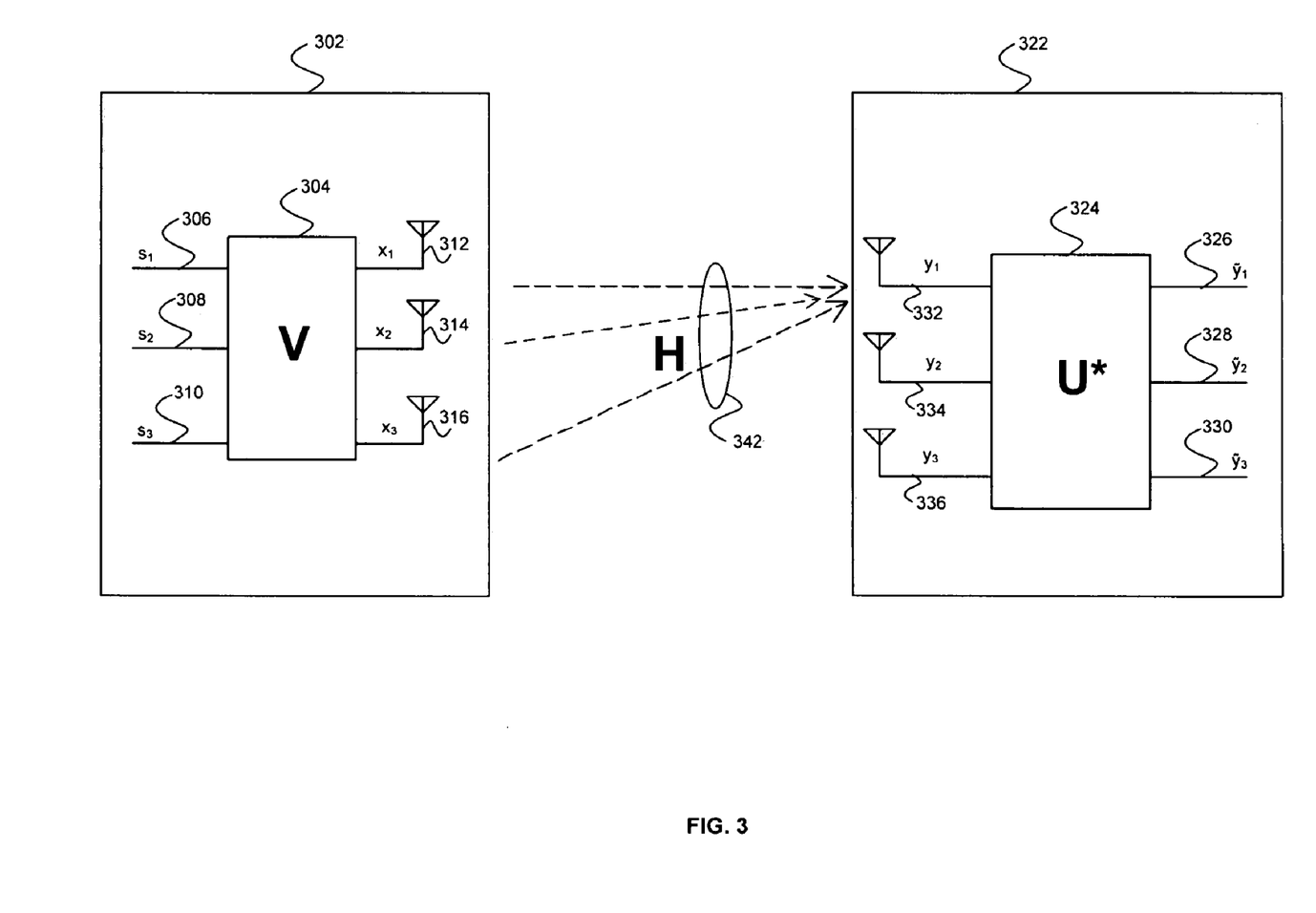
FIG. 3 is an exemplary diagram illustrating beamforming that may be utilized in connection with an embodiment of the invention.

FIG. 3 is an exemplary diagram illustrating beamforming that may be utilized in connection with an embodiment of the invention. Referring to FIG. 3 there is shown a transmitting mobile terminal 302, a receiving mobile terminal 322, and a plurality of RF channels 342. The transmitting mobile terminal 302 comprises a transmit filter coefficient block V 304, a first source signal $s_1$ 306, a second source signal $s_2$ 308, a third source signal $s_3$ 310, and a plurality of transmitting antenna 312, 314, and 316.

In operation, the transmitting antenna 312 may enable transmission of a signal $x_1$, the transmitting antenna 314 may transmit a signal $x_2$, and the transmitting antenna 316 may transmit a signal $x_3$. In beamforming each transmitted signal $x_1$, $x_2$, and $x_3$ may be a function of a weighted summation of at least one of the plurality of the source signals $s_1$, $s_2$, and $s_3$. The weights may be determined by the transmit filter coefficient block V such that: X=VS, where S may be represented by a 3×1 matrix $\{s_1, s_2, s_3\}$, V may be represented by a 3×3 matrix $\{\{v_{11}, v_{12}, v_{13}\}\{v_{21}, v_{22}, v_{23}\}\{v_{31}, v_{32}, v_{33}\}\}$, and X may be represented by a 3×1 matrix $\{x_1, x_2, x_3\}$. The receiving mobile terminal 322 comprises a receive filter coefficient block U* 324, a first destination signal $\bar{y}_1$ 326, a second destination signal $\bar{y}_2$ 328, a third destination signal $\bar{y}_3$ 330, and a plurality of receiving antenna 332, 334, and 336. The receiving antenna 332 may receive a signal $y_1$, the receiving antenna 334 may receive a signal $y_2$, and the receiving antenna 336 may receive a signal $y_3$. The characteristics of the plurality of RF channels 342 utilized for communication between the transmitting mobile terminal 302, and the receiving mobile terminal 322 may be represented mathematically by a transfer coefficient matrix H.

The plurality of received signals $y_1$, $y_2$, $y_3$, may be expressed as a function of the plurality of transmitted signals $x_1$, $x_2$, $x_3$, and the transfer coefficient matrix H in the following equation:

$$Y = HX + N, \text{ where} \qquad \text{equation [1]}$$

Y={$y_1, y_2, y_3$} may be represented as a 3×1 matrix; X may be represented as a 3×1 matrix {$x_1, x_2, x_3$}; H may be represented as a 3×3 matrix {{$h_{11}, h_{12}, h_{13}$}{$h_{21}, h_{22}, h_{23}$}{$h_{31}, h_{32}, h_{33}$}}; and N may be represented as is a 3×1 matrix {$n_1, n_2, n_3$}. The matrix N may represent random noise that may exist in the communication medium between the transmitting station 302 and the receiving station 322.

In a MIMO system that utilizes beamforming, the values associated with the matrices V, H, and U* may be such that the value of the transmitted signal $s_i$ may be approximately equal to the value of the corresponding received signal $\bar{y}_i$, where the index i may indicate an $i^{th}$ spatial stream. The receiver 322 may compute a channel estimate, $H_{down}$, for a downlink RF channel based on a received signal from the transmitter 302. The transmitter 302 may compute a channel estimate, $H_{up}$, for an uplink RF channel based on a received signal from the receiver 322. In the absence of explicit feedback information received from the receiver 322, the transmitter may assume channel reciprocity. The coefficient block V 304 may set values associated with the matrix V, utilized for communications via the downlink RF channel, based on the channel estimate $H_{up}$.

When the receiver 322 sends explicit feedback information to the transmitter 302 via the uplink RF channel, the receiver 322 may compute values associated with a matrix V that may be based on the channel estimate $H_{down}$. The receiver 322 may subsequently communicate the computed matrix V to the transmitter 302 via the uplink RF channel. The transmitter 302 may subsequently set values associated with the matrix V, utilized for communications via the downlink RF channel, based on the channel estimate $H_{down}$.

Various embodiments of the invention may reduce the quantity of explicit feedback information that may be communicated from the receiver 322 to the transmitter 302 via the uplink RF channel. In one aspect of the invention, the computed matrix V may be represented based on a product of Givens matrices:

$$V = G_1(\psi_1) G_2(\psi_2) D_1(\phi_1, \phi_2, \ldots, \phi_N) \qquad \text{equation [2]}$$

where $G_j(\psi_j)$ may represent a Givens matrix associated with a rotation angle $\psi_j$, and $D_1(\phi_k)$ may represent a diagonal matrix with phase shift angles $\phi_k$.

The explicit feedback information communicated by the receiver 322 may comprise encoded rotation angles $\psi_j$. The transmitter 302 may utilize the encoded rotation angles to reconstruct the matrix V based on the explicit feedback information.

Figure 4:
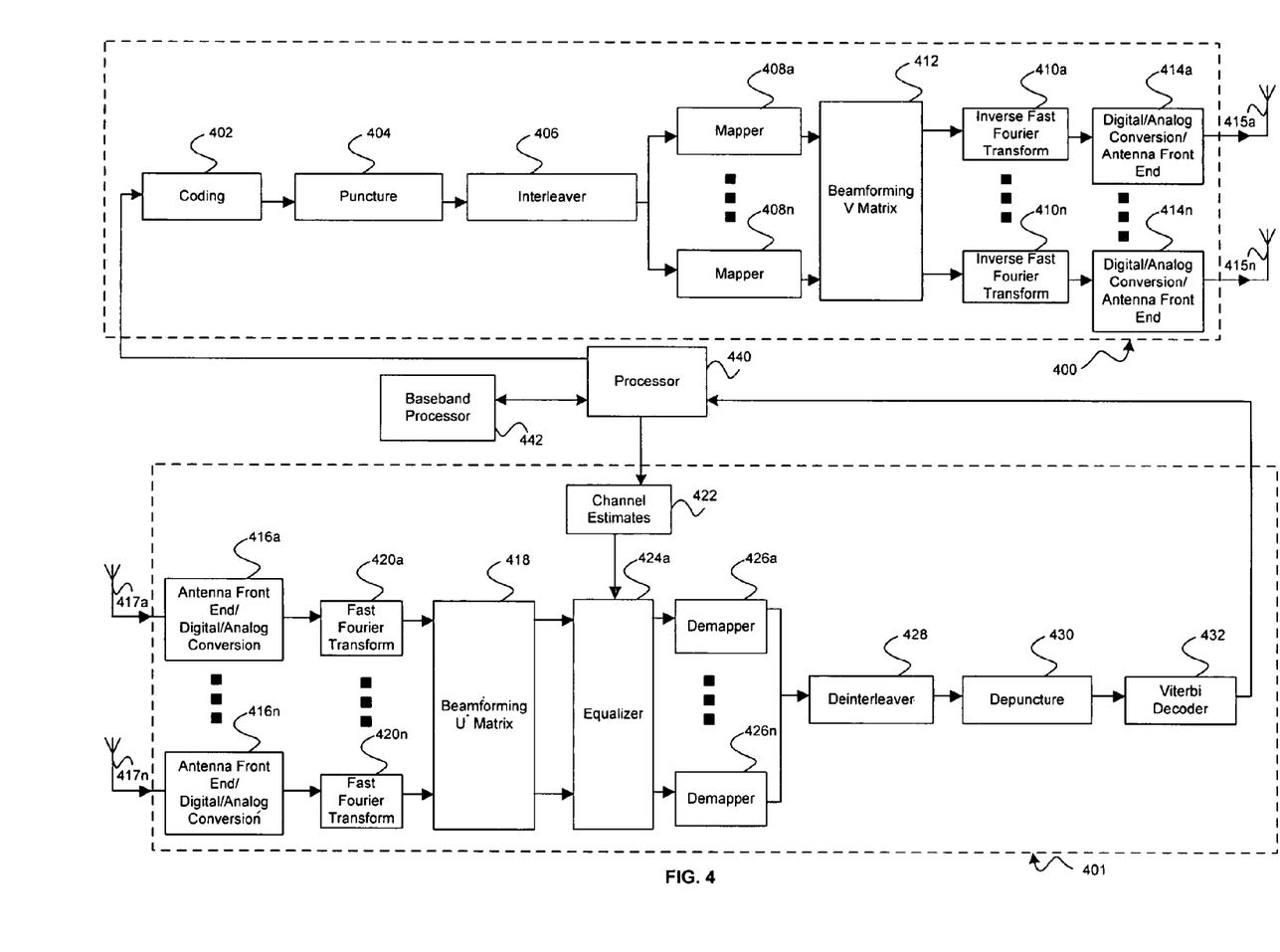
FIG. 4 is an exemplary functional block diagram of transceiver comprising a transmitter and a receiver in a MIMO system, which may be utilized in accordance with an embodiment of the invention.

FIG. 4 is an exemplary functional block diagram of transceiver comprising a transmitter and a receiver in a MIMO system, which may be utilized in accordance with an embodiment of the invention. FIG. 4 shows transceiver comprising a transmitter 400, a receiver 401, a processor 440, a baseband processor 442, a plurality of transmitter antennas 415a . . . 415n, and a plurality of receiver antennas 417a . . . 417n. The transmitter 400 may comprise a coding block 402, a puncture block 404, an interleaver block 406, a plurality of mapper blocks 408a . . . 408n, a plurality of inverse fast Fourier transform (IFFT) blocks 410a . . . 410n, a beamforming V matrix block 412, and a plurality of digital to analog (D to A) conversion and antenna front end blocks 414a . . . 414n. The receiver 401 may comprise a plurality of antenna front end and analog to digital (A to D) conversion blocks 416a . . . 416n, a beamforming U* matrix block 418, a plurality of fast Fourier transform (FFT) blocks 420a . . . 420n, a channel estimates block 422, an equalizer block 424, a plurality of demapper blocks 426a . . . 426n, a deinterleaver block 428, a depuncture block 430, and a Viterbi decoder block 432.

The variables V and U* in beamforming blocks 412 and 418 respectively refer to matrices utilized in the beamforming technique. U.S. application Ser. No. 11/052,389 filed Feb. 7, 2005, provides a detailed description of Eigenbeamforming, which is hereby incorporated herein by reference in its entirety.

The processor 440 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 442 may similarly perform functions in accordance with applicable communications standards. These functions may comprise, but are not limited to, tasks related to analysis of data received via the receiver 401, and tasks related to generating data to be transmitted via the transmitter 400. These tasks may further comprise medium access control (MAC) layer functions as specified by pertinent standards.

In the transmitter 400, the coding block 402 may transform received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate may be specified using the notation $i_b/t_b$, where $t_b$ represents the total number of bits that comprise a coding group of bits, while $i_b$ represents the number of information bits that are contained in the group of bits $t_b$. Any number of bits $t_b - i_b$ may represent redundant bits that may enable the receiver 401 to detect and correct errors introduced during transmission. Increasing the number of redundant bits may enable greater capabilities at the receiver to detect and correct errors in information bits. The penalty for this additional error detection and correction capability may result in a reduction in the information transfer rates between the transmitter 400 and the receiver 401. The invention is not limited to BCC, and any one of a plurality of coding techniques, for example, Turbo coding or low density parity check (LDPC) coding, may also be utilized.

The puncture block 404 may receive transformed binary input data blocks from the coding block 402 and alter the coding rate by removing redundant bits from the received transformed binary input data blocks. For example, if the coding block 402 implemented a ½ coding rate, 4 bits of data received from the coding block 402 may comprise 2 information bits, and 2 redundant bits. By eliminating 1 of the redundant bits in the group of 4 bits, the puncture block 404 may adapt the coding rate from ½ to ⅔. The interleaver block 406 may rearrange bits received in a coding rate-adapted data block from the puncture block 404 prior to transmission via an RF channel to reduce the probability of uncorrectable corruption of data due to burst of errors, impacting contiguous bits, during transmission via an RF channel. The output from the interleaver block 406 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 406, $n_{st}$, and a given number of bits assigned to an individual stream i by the interleaver block 406, $b_{st}(i)$:

$$b_{db} = \sum_{i=0}^{n_{st}-1} b_{st}(i) \quad \text{equation [3]}$$

For a given number of coded bits before interleaving, $b_{db}$, each bit may be denoted by an index, k=0, 1 ... $b_{db}$−1. The interleaver block 406 may assign bits to the first spatial stream, spatial stream 0, $b_{st}(0)$, for bit indexes k=0, $n_{st}$, $2*n_{st}$, ..., $b_{db}$−$n_{st}$. The interleaver block 406 may assign bits to spatial stream 1, $b_{st}(1)$, for bit indexes k=1, $n_{st}$+1, $2*n_{st}$+1, ..., $b_{db}$−$n_{st}$+1. The interleaver block 406 may assign bits to spatial stream 2, $b_{st}(2)$, for bit indexes k=2, $n_{st}$+2, $2*n_{st}$+2, ..., $b_{db}$−$n_{st}$+2. The interleaver block 406 may assign bits to spatial stream $n_{st}$, $b_{st}(n_{st})$, for bit indexes k=$n_{st}$1, $2*n_{st}$−1, $3*n_{st}$−1, ..., $b_{db}$−1.

The plurality of mapper blocks 408a ... 408n may comprise a number of individual mapper blocks that is equal to the number of individual streams generated by the interleaver block 406. Each individual mapper block 408a ... 408n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 408a ... 408n for stream i may utilize a modulation technique to map a plurality of bits, $b_{st}(i)$, into a symbol.

The beamforming V matrix block 412 may apply the beamforming technique to the plurality of symbols, or "spatial modes", generated from the plurality of mapper blocks 408a ... 408n. The beamforming V matrix block 412 may generate a plurality of signals where the number of signals generated may be equal to the number of transmitting antenna at the transmitter 400. Each signal in the plurality of signals generated by the beamforming V block 412 may comprise a weighted sum of at least one of the received symbols from the mapper blocks 408a ... 408n.

The plurality of IFFT blocks 410a ... 410n may receive a plurality of signals from the beamforming block 412. Each IFFT block 410a ... 410n may subdivide the bandwidth of the RF channel into a plurality of n sub-band frequencies to implement orthogonal frequency division multiplexing (OFDM), buffering a plurality of received signals equal to the number of sub-bands. Each buffered signal may be modulated by a carrier signal whose frequency is based on that of one of the sub-bands. Each of the IFFT blocks 410a ... 410n may then independently sum their respective buffered and modulated signals across the frequency sub-bands to perform an n-point IFFT thereby generating a composite OFDM signal.

The plurality of digital (D) to analog (A) conversion and antenna front end blocks 414a ... 414n may receive the plurality of signals generated by the plurality of IFFT blocks 410a ... 410n. The digital signal representation received from each of the plurality of IFFT blocks 410a ... 410n may be converted to an analog RF signal that may be amplified and transmitted via an antenna. The plurality of D to A conversion and antenna front end blocks 414a ... 414n may be equal to the number of transmitting antenna 415a ... 415n. Each D to A conversion and antenna front end block 414a ... 414n may receive one of the plurality of signals from the beamforming V matrix block 412 and may utilize an antenna 415a ... 415n to transmit one RF signal via an RF channel.

In the receiver 401, the plurality of antenna front end and A to D conversion blocks 416a ... 416n may receive analog RF signals via an antenna, converting the RF signal to baseband and generating a digital equivalent of the received analog baseband signal. The digital representation may be a complex quantity comprising I and Q components. The number of antenna front end and A to D conversion blocks 416a ... 416n may be equal to the number of receiving antenna 417a ... 417n.

The plurality of FFT blocks 420a ... 420n may receive a plurality of signals from the plurality of antenna front end and A to D conversion blocks 416a ... 416n. The plurality of FFT blocks 420a ... 420n may be equal to the number of antenna front end and A to D conversion blocks 416a ... 416n. Each FFT block 420a ... 420n may receive a signal from an antenna front end and A to D conversion block 416a ... 416n, independently applying an n-point FFT technique, and demodulating the signal by a utilizing a plurality of carrier signals based on the n sub-band frequencies utilized in the transmitter 400. The demodulated signals may be mathematically integrated over one sub band frequency period by each of the plurality of FFT blocks 420a ... 420n to extract n symbols contained in each of the plurality of OFDM signals received by the receiver 401.

The beamforming U* block 418 may apply the beamforming technique to the plurality of signals received from the plurality of FFT blocks 420a ... 420n. The beamforming U* block 418 may generate a plurality of signals where the number of signals generated may be equal to the number of spatial streams utilized in generating the signals at the transmitter 400. Each of the plurality of signals generated by the beamforming U* block 418 may comprise a weighted sum of at least one of the signals received from the FFT blocks 420a ... 420n.

The channel estimates block 422 may utilize preamble information, contained in a received RF signal, to compute channel estimates. The equalizer block 424 may receive signals generated by the beamforming U* block 418. The equalizer block 424 may process the received signals based on input from the channel estimates block 422 to recover the symbol originally generated by the transmitter 400. The equalizer block 424 may comprise suitable logic, circuitry, and/or code that may enable transformation of symbols received from the beamforming U* block 418 to compensate for fading in the RF channel.

The plurality of demapper blocks 426a ... 426n may receive symbols from the equalizer block 424, reverse mapping each symbol to one or more binary bits by applying a demodulation technique, based on the modulation technique utilized in generating the symbol at the transmitter 400. The plurality of demapper blocks 426a ... 426n may be equal to the number of streams in the transmitter 400.

The deinterleaver block 428 may receive a plurality of bits from each of the demapper blocks 426a ... 426n, rearranging the order of bits among the received plurality of bits. The deinterleaver block 428 may rearrange the order of bits from the plurality of demapper blocks 426a ... 426n in, for example, the reverse order of that utilized by the interleaver 406 in the transmitter 400. The depuncture block 430 may insert "null" bits into the output data block received from the deinterleaver block 428 that were removed by the puncture block 404. The Viterbi decoder block 432 may decode a depunctured output data block, applying a decoding technique that may recover the binary data blocks that were input to the coding block 402.

In operation, the processor 440 may receive decoded data from the Viterbi decoder 432. The processor 440 may communicate received data to the baseband processor 442 for analysis and further processing. The processor 440 may also communicate data received via the RF channel, by the receiver 401, to the channel estimates block 422. This information may be utilized by the channel estimates block 422, in the receiver 401, to compute channel estimates for a received RF channel. The baseband processor 442 may generate data to be transmitted via an RF channel by the transmitter 400. The baseband processor 442 may communicate the data to the processor 440. The processor 440 may generate a plurality of bits that are communicated to the coding block 402.

The elements shown in FIG. 4 may comprise components that may be present in an exemplary embodiment of a wireless communications terminal. One exemplary embodiment of a may be a wireless communications transmitter comprising a transmitter 400, a processor 440, and a baseband processor 442. Another exemplary embodiment of a may be a wireless communications receiver comprising a receiver 401, a processor 440, and a baseband processor 442. Another exemplary embodiment of a may be a wireless communications transceiver comprising a transmitter 400, a receiver 401, a processor 440, and a baseband processor 442.

A MIMO system may transmit information via one or more RF channels as specified by IEEE standard 802.11n. Such a MIMO system may be referred to as an IEEE 802.11n WLAN device. IEEE 802.11n provides specification for 20 MHz channels and 40 RF MHz channels. A 20 MHz RF channel may be characterized by a bandwidth of about 20 MHz. A 40 MHz RF channel may be characterized by a bandwidth of about 40 MHz. A MIMO system that transmits and/or receives information via a 20 MHz RF channel may utilize a total of 56 subcarriers in the 20 MHz channel, comprising 2 pilot tones, and 54 data-bearing subcarriers. The subcarriers may be distributed symmetrically around a frequency that represents a center frequency for a 20 MHz channel, for example. The frequency spacing between subcarriers in an IEEE 802.11n WLAN device may be approximately equal to 312.5 KHz, for example. A 20 MHz channel may comprise a plurality of subcarriers for which the frequency of a subcarrier, $f_{sc}(i)$, may be represented as:

$$f_{sc}(i) = f_{center} + i\Delta_f, \text{ where,} \quad \text{equation [4]}$$

the frequency, $f_{center}$, may represent the center frequency in a 20 MHz channel, the frequency increment, $\Delta_f$, may represent the frequency spacing between subcarriers, and the value of the subcarrier index, i, may comprise a plurality of integer values represented as:

$$0 < i \leq N_{sc}/2, \text{ or} \quad \text{equation [5]}$$

$$-N_{sc}/2 \leq i < 0, \text{ where} \quad \text{equation [6]}$$

$N_{sc}$ may represent the number of subcarriers present in a 20 MHz channel.

An IEEE 802.11n 40 MHz channel may comprise a plurality of subcarriers for which the frequency of a subcarrier $f^{40}_{sc}(i)$ may be represented as:

$$f_{sc}^{40}(i) = f_{primary} + i\Delta_f, \text{ or} \quad \text{equation [7]}$$

$$f_{sc}^{40}(i) = f_{secondary} + i\Delta_f, \text{ where} \quad \text{equation [8]}$$

$f_{primary}$ may represent the center frequency of a primary 20 MHz channel, $f_{secondary}$ may represent the center frequency of a secondary 20 MHz channel, and the index, i, may be as defined in equations [7] and [8]. The primary and secondary 20 MHz channels may be adjacent channels such that:

$$f_{secondary} = f_{primary} \pm 20 \text{ MHz, where} \quad \text{equation [9]}$$

the secondary 20 MHz channel may be located at an adjacent channel for which the center frequency $f_{secondary}$ is either 20 MHz higher or 20 MHz lower than the center frequency of the primary 20 MHz channel $f_{primary}$. A 40 MHz channel may comprise a plurality of $N_{sc}$ subcarriers located at the primary 20 MHz channel, and subsequent plurality of $N_{sc}$ subcarriers located at the secondary 20 MHz channel, where $N_{sc}$ may represent the number of subcarriers in a 20 MHz channel. In this regard, a 40 MHz channel may comprise a total of $2N_{sc}$ subcarriers, where the value $N_{sc}$ may be defined based on the number of subcarriers contained in the primary or secondary 20 MHz channel. If the primary or secondary channel comprises 56 subcarriers, then the 40 MHz channel may comprise a total of 112 subcarriers.

A MIMO system may utilize an antenna configuration represented as $N_{TX} \times N_{RX}$, where $N_{TX}$ may represent the number of transmitting antenna at a station. Transmitting antennas may be utilized to transmit signals via an RF channel. $N_{RX}$ may represent the number of receiving antenna at a station that receives the signals.

The MIMO system may utilize OFDM to encoded one or more bits of information in one or more subcarriers associated with an RF channel. The encoded bits in one subcarrier may be referred to as a symbol. The encoded bits in the subcarriers associated with an RF channel may collectively be referred to as an OFDM symbol. The number of binary bits contained in an OFDM symbol, $N_{DBPS}$, may be determined as shown in the following equation:

$$N_{DBPS} = N_{DSC} * N_B(CON) * R \quad \text{equation [10]}$$

where $N_{DSC}$, may represent the number of data bearing subcarriers in an RF channel, $N_B(CON)$ may represent the number of binary bits/symbol based on the modulation type, and R may represent the coding rate. For a 20 MHz RF channel, $N_{DSC}$ may be approximately equal to 54. For a 40 MHz RF channel, $N_{DSC}$ may be approximately equal to 108. For a modulation type of 64 QAM, the number of binary bits/symbol may approximately equal to 6. For example, for a 40 MHz RF channel utilizing 64 QAM and a ¾ coding rate, $N_{DSC}=108$, $N_B(CON)=6$, and $R=¾$. Consequently, the number of bits contained in an OFDM symbol $N_{DBPS}=486$ bits. Given a transmission rate of about 250,000 OFDM symbols/second, the corresponding data rate associated with the RF channel may be more than 121 Mbits/second. When beamforming is utilized, the total number of bits simultaneously transmitted via $N_{SS}$ number of spatial streams may equal approximately $N_{SS} \times N_{DBPS}$. Therefore, for a MIMO system that utilizes 4 transmitting antennas, each of which transmits an independent spatial stream, the total number of bits transmitted approximately simultaneously may equal about 1,944. The corresponding data rate associated with the MIMO system may be about 486 M bits/second.

Various embodiments of the invention comprise a method for reducing the quantity of information, as measured in a number of bits for example, that may be transmitted to describe a downlink RF channel in explicit feedback information when compared to an amount of information that may be transmitted utilizing conventional approaches. The number of bits that may be transmitted in explicit feedback information when utilizing a polar coordinate format may be fewer than a corresponding number of bits that may be transmitted when utilizing a Cartesian coordinate format.

The feedback V matrix may comprise an array of magnitude and corresponding angle component pairs associated with beamforming factors. For example, a 3×3 V matrix comprising 3 rows an 3 columns may be represented as follows:

$$\begin{bmatrix} V_{1,1}(f_k) & V_{1,2}(f_k) & V_{1,3}(f_k) \\ V_{2,1}(f_k) & V_{2,2}(f_k) & V_{2,3}(f_k) \\ V_{3,1}(f_k) & V_{3,2}(f_k) & V_{3,3}(f_k) \end{bmatrix} \qquad \text{equation [11]}$$

where $V_{m,n}(f_k)$ may represent a beamforming factor associated with the $k^{th}$ frequency subcarrier transmitted by the $m^{th}$ transmitting antenna and received by an $n^{th}$ receiving antenna, and $k=1,2,\ldots,N_{sc}$. The value $N_{sc}$ may represent the number of frequency subcarriers including all data tones and pilot tones associated with an RF channel.

In one aspect related to the matrix V, a matrix multiplication of V and V* may produce an identity I matrix. The matrix V* may represent an Hermitian transpose of the matrix V. An Hermitian transpose of a matrix may be represented by constructing a transpose of the matrix followed by constructing a complex conjugate version of each element in the transposed matrix. An identity matrix may be characterized by an array for which diagonal elements contain a value equal to 1 and non-diagonal elements contain a value equal to 0. An identity matrix may be represented as a square matrix in that the number of rows in the matrix may be equal to the number of columns. When the conditions VV*=I and V*V=I are true, the matrix V may be referred to as a unitary matrix. The unitary matrix V may contain redundant information. Consequently, the number of degrees of freedom of the matrix V may be less than N×N. This may imply that it may be possible to reduce the number of parameters based on the number of degrees of freedom of the matrix V, for example, using angles.

When the V matrix contains redundant information, at least a portion of the angle components contained in the matrix may be redundant. In this case, the number of bits that may be transmitted as explicit feedback information in a redundancy reduced V matrix may be reduced when compared to conventional approaches that may not utilize redundant information.

Various embodiments of the invention may comprise a method and system for reducing the number of bits that may be transmitted in explicit feedback information. The method and system may utilize Givens rotation.

An N×M matrix comprising matrix elements arranged in N rows and M columns may represent a N-dimensional vector space. For a given matrix element for which a corresponding value is not equal to 0, a Givens rotation may be utilized to rotate the N-dimensional vector space such that the value of the corresponding matrix element in the rotated vector space is about equal to 0. The Givens rotation may be represented as an N×N Givens rotation matrix, $G_{li}(\psi)$, in the following expression:

$$G_{li}(\psi_{li}) = \begin{bmatrix} I_{I-1} & 0 & 0 & 0 & 0 \\ 0 & \cos(\psi_{li}) & 0 & \sin(\psi_{li}) & 0 \\ 0 & 0 & I_{i-I-1} & 0 & 0 \\ 0 & -\sin(\psi_{li}) & 0 & \cos(\psi_{li}) & 0 \\ 0 & 0 & 0 & 0 & I_{N-i} \end{bmatrix} \qquad \text{equation [12]}$$

where I may indicate a row in a matrix, i may indicate a column, $I_n$ may represent an identity matrix comprising n rows and n columns, and $\psi_{li}$ may represent a rotation angle. The value of the element located at the $I^{th}$ row and $I^{th}$ column in the matrix of equation [12] may be about equal to the value of the expression $\cos(\psi_{li})$. The value of the element located at the $i^{th}$ row and $i^{th}$ column may be about equal to the value of the expression $\cos(\psi_{li})$. The value of the element located at the $I^{th}$ row and $i^{th}$ column may be about equal to the value of the expression $-\sin(\psi_{li})$. The value of the element located at the $i^{th}$ row and $I^{th}$ column may be about equal to the value of the expression $\sin(\psi_{li})$. Each "0" indicated in the matrix of equation [12] may represent one or more matrix elements for which each corresponding value is about 0. For example, the first row of 0's in the matrix may represent a block of elements comprising I–1 rows and N–(I–1) columns for which the value of each element is about 0. A block of elements comprising 0 rows and/or 0 columns may be omitted from the matrix of equation [12].

A Givens rotation matrix may generally be utilized to rotate elements in a matrix for which the associated values are represented by real numbers. The beamforming matrix, V, may generally comprise elements for which the associated values are represented by complex numbers. The matrix V may be multiplied by an M×M column-wise phase shift matrix, $\tilde{D}$, which may be represented as follows:

$$\tilde{D} = \begin{bmatrix} e^{j\theta_1} & 0 & \ldots & 0 \\ 0 & e^{j\theta_2} & 0 & \vdots \\ \vdots & 0 & \ddots & 0 \\ 0 & \ldots & 0 & e^{j\theta_M} \end{bmatrix} \qquad \text{equation [13]}$$

where $\theta_i$ may represent a phase shift associated with column i, e may represent a value about equal to 2.718, and j may represent the complex value equal to the square root of –1.

The matrix $\tilde{V}=V\tilde{D}$ may represent a column-wise phase shifted version of the matrix V. The corresponding values of elements located at the $i^{th}$ row and $i^{th}$ column of the matrix $\tilde{V}$, multiplied by series of $G_{li}$ and $D_i$, may be represented by real numbers. The unitary matrix V may be column-wise phase invariant. For a column-wise phase invariant matrix, the matrix V may be considered to be equivalent to the matrix $\tilde{V}$.

The matrix V may be multiplied by an N×N second phase shift matrix, $D_i$, which may be represented as follows:

$$D_i = \begin{bmatrix} I_i & 0 & \ldots & 0 \\ 0 & e^{j\varphi_{i+1,i}} & 0 & \vdots \\ \vdots & 0 & \ddots & 0 \\ 0 & \ldots & 0 & e^{j\varphi_{N,i}} \end{bmatrix} \qquad \text{equation [14]}$$

where $\phi_{a,b}$ may represent a phase shift associated with a matrix element located at row a and column b in $\tilde{V}$.

The result of the matrix multiplication $D_i^*V\tilde{D}$ may represent a phase shifted version of the matrix V, where $D_i^*$ may represent an Hermitian transpose of the phase shift matrix $D_i$. The corresponding values of elements located at the $i^{th}$ column of the product matrix $D_i^*V\tilde{D}$ may be represented by real numbers.

The matrix product $G_{li}(\psi_{li})D_i^*V\tilde{D}$ may represent a Givens rotated version of the matrix $D_i^*V\tilde{D}$. An N-dimensional vector space represented by the matrix product $G_{li}(\psi_{li})D_i^*V\tilde{D}$ may be equivalent to a $\psi_{li}$ degree angular rotation applied to the N-dimensional vector space represented by the matrix $D_i^*V\tilde{D}$. If a nonzero value is associated with an element located in the $I^{th}$ row and $i^{th}$ column of the matrix $D_i^*V\tilde{D}$, represented as the (l,i) element, the corresponding value of the (l,i) element of the matrix product $G_{li}(\psi_{li})D_i^* V\tilde{D}$ may be about equal to 0.

One characteristic of Givens rotations is that rotations may be applied iteratively to select matrix elements for which corresponding values are to be set to about 0 as a result of successive rotations. For example, based on a current Givens rotation matrix, $G_{li}(\psi_{li})$, and a subsequent Givens matrix $G_{ki}(\psi_{ki})$, a subsequent matrix product $G_{li}(\psi_{li})G_{ki}(\psi_{ki})D_i^* V\tilde{D}$ may be computed. The value of the (l,i) element of the subsequent matrix product may be equal to about 0. The value of the (k,i) element of the subsequent matrix product may also be about equal to 0.

In various embodiments of the invention, the process may be repeated until a subsequent rotated matrix is computed such that the value associated with each element l in column i is about equal to 0. The range of values for the row indicator l may be subject to the following condition:

$$N \geq l > i \qquad \text{equation [15]}$$

where N may represent the number of rows in the matrix V.

After repeating the process for each element l in column i=1, for example, a subsequent rotated matrix may be represented as follows:

$$G_{21}(\psi_{21})G_{31}(\psi_{31}) \ldots G_{N1}(\psi_{N1})D_1^* V\tilde{D} = \qquad \text{equation [16]}$$

$$\begin{bmatrix} 1 & 0 & \ldots & 0 \\ 0 & & & \\ \vdots & & V_2 & \\ 0 & & & \end{bmatrix}$$

where $V_2$ may represent an $(N-1) \times (M-1)$ submatrix.

For an $i^{th}$ column, equation [16] may be generalized and represented as follows:

$$G_{i+1,i}(\psi_{21})G_{i+2,i}(\psi_{31}) \ldots G_{N,1}(\psi_{n1})D_1^* R_i = \qquad \text{equation [17]}$$

$$\begin{bmatrix} I_i & 0 & \ldots & 0 \\ 0 & & & \\ \vdots & & V_{i+1} & \\ 0 & & & \end{bmatrix}$$

where $R_i$ may represent a previous rotated matrix, and $V_{i+1}$ may represent an $(N-i) \times (M-i)$ submatrix. The phase shift angle $\theta_{i+1}$ in equation [13] may be defined such that the (1,1) element in the matrix $V_{i+1}$ may be represented by real numbers.

In various embodiments of the invention, the process shown in equation [17] may be repeated for a subsequent column wherein the range of values for the column indicator i may be subject to the following condition:

$$\min(M, N-1) \geq i \geq 1 \qquad \text{equation [18]}$$

where N may represent the number of rows in the matrix V, M may represent the number of columns in the matrix V, and min(a,b) may represent an expression, the value of which may be the minimum value among arguments a and b.

Based on equations [12], [14], [17], [18], and the unitary matrix property, the matrix V may be expressed based the Givens rotations according to the following equation:

$$V = \sum_{i=1}^{\min(M,N-1)} \left[ D_i \prod_{l=i+1}^{N} G_{li}^*(\psi_{li}) \right] \times \tilde{I} \qquad \text{equation [19]}$$

where $\tilde{I}$ may represent an N×M matrix comprising an identity matrix $I_{\min(N,M)}$ and either a block of max(0,N–M) rows of elements, or a block of max(0,M–N) columns of elements, with each element of a value about 0, max(a,b) may represent an expression, the value of which may be the maximum value among arguments a and b, and the operator $\pi[X_i]$ may represent a right-side matrix multiplication product among a set of matrices $X_i$. $G_{li}(\psi_{li})^*$ may represent an Hermitian transpose of the Givens rotation matrix $G_{li}(o_i)$. The Givens rotation matrix $G_{li}(\psi_{li})$ is as defined in equation [12] and the phase shift matrix $D_i$ is as defined in equation [14].

In various embodiments of the invention, explicit feedback information may comprise values for one or more rotation angle parameters comprising one or more phase shift angles $\phi_{li}$ and one or more Givens rotation angles $\psi_{li}$. The following table represents the number of parameters that may be utilized in explicit feedback information to represent an N×M beamforming matrix V, for exemplary values of N rows and M columns:

TABLE 1

Angles to be reported in explicit feedback information

| Dimensions (N × M) | Number of Parameters | Explicit Feedback Angle Parameters |
|---|---|---|
| 2 × 1 | 2 | $\Phi_{21}, \psi_{21}$ |
| 2 × 2 | 2 | $\Phi_{21}, \psi_{21}$ |
| 3 × 1 | 4 | $\Phi_{21}, \Phi_{31}, \psi_{21}, \psi_{31}$ |
| 3 × 2 | 6 | $\Phi_{21}, \Phi_{31}, \psi_{21}, \psi_{31}, \Phi_{32}, \psi_{32}$ |
| 3 × 3 | 6 | $\Phi_{21}, \Phi_{31}, \psi_{21}, \psi_{31}, \Phi_{32}, \psi_{32}$ |
| 4 × 1 | 6 | $\Phi_{21}, \Phi_{31}, \Phi_{41}, \psi_{21}, \psi_{31}, \psi_{41}$ |
| 4 × 2 | 10 | $\Phi_{21}, \Phi_{31}, \Phi_{41}, \psi_{21}, \psi_{31}, \psi_{41}, \Phi_{32}, \Phi_{42}, \psi_{32}, \psi_{42}$ |
| 4 × 3 | 12 | $\Phi_{21}, \Phi_{31}, \Phi_{41}, \psi_{21}, \psi_{31}, \psi_{41}, \Phi_{32}, \Phi_{42}, \psi_{32}, \psi_{42}, \Phi_{43}, \psi_{43}$ |
| 4 × 4 | 12 | $\Phi_{21}, \Phi_{31}, \Phi_{41}, \psi_{21}, \psi_{31}, \psi_{41}, \Phi_{32}, \Phi_{42}, \psi_{32}, \psi_{42}, \Phi_{43}, \psi_{43}$ |

The feedback angles represented in Table 1 may be reported for each of the $N_{sc}$ plurality of frequency subcarriers associated with the corresponding downlink RF channel. The order of angles represented in Table 1 may be determined based on the order of multiplications that may be performed when reconstructing the V matrix for each subcarrier at the WLAN 106 that receives the explicit feedback information. For example, for given feedback angles, $\psi_{li}$ and $\psi_{li}$, the angles may be represented as a vectors of angles, $\phi_{li}[-N_{sc}/2, -N_{sc}/2+1, \ldots, -2, -1, 1, 2, \ldots, N_{sc}/2-1, N_{sc}/2]$ and $\psi_{li}[-N_{sc}/2, -N_{sc}/2+1, \ldots, -2, -1, 1, 2, \ldots, N_{sc}/2-1, N_{sc}/2]$, where $N_{sc}$ may represent the number of subcarriers associated with the downlink RF channel.

Actual values for angles reported in explicit feedback information may be determined based on a codebook. For example, a range of true values for Givens rotation angles may comprise $0 \leq \psi_{li} \leq \pi/2$. A range of true values for phase rotation angles may comprise $0 \leq \phi_{li} \leq 2\pi$, for example. Values for the Givens rotation angles may be approximated based on a binary encoding comprising a plurality of $b_\psi$ bits. Values for Givens rotation angles that are represented by a binary encoding of bits may be referred to as quantized values. The range of values for binary quantized values for the Givens rotation angles may comprise $k\pi/2^{b_\psi+1} + \pi/2^{b_\psi+2}$, where k may be equal to one of a range of values comprising $0, 1, \ldots, 2^{b_\psi}-1$, for example. Values for the phase rotation angles may be approximated based on a binary encoding comprising a plurality of $b_\phi$ bits. The range of values for binary quantized values for the phase rotation angles may comprise $k\pi/2^{b_\psi-1}+\pi/2^{b_\psi}$, where k may be equal to one of a range of values comprising $0, 1, \ldots, 2^{b_\psi}-1$, for example. Differences in value between a true value and a corresponding quantized value may be referred to as a quantization error. The potential size of a given quantization error may be based on the number of bits utilized during binary encoding.

The number of bits utilized during binary encoding of $\psi_{li}$ and during binary encoding of $\psi_{li}$ respectively may be represented as a ($b_\psi$, $b_\phi$) tuple. A tuple utilized in an exemplary codebook may comprise (1,3) to represent the combination $b_{104}=1$ and $b_\phi=3$. Other tuples in the exemplary codebook may comprise (2,4), (3,5), or (4,6).

Various embodiments of the invention may comprise a method and a system for utilizing Givens rotations for representing beamforming matrices in explicit feedback information. In one aspect of the invention, the number of bits contained in the explicit feedback information may be reduced in comparison to a corresponding number of bits contained in explicit feedback information based on a Cartesian coordinate format representation. The number of bits contained in explicit feedback information, which is generated in accordance with an embodiment of the invention may be determined based on the size of the V matrix, as measured by N rows and M columns, the number of subcarriers associated with the corresponding downlink RF channel, and the number of bits utilized during binary encoding of the Givens rotation angles, and phase rotation angles.

Table 2 presents an exemplary mapping between bits contained in explicit feedback information, and the corresponding angle that may be reported. In Table 2, N=2, M=2, the downlink channel may be a 20 MHz RF channel, and the bits utilized may be represented by (3,5). The range $b_j \ldots b_k$ may represent a range of bit positions in the explicit feedback information where in $b_j$ may represent the least significant bit (LSB) in the range and $b_k$ may represent the most significant bit (MSB) in the range, for example. The notation $f_p$ may represent a frequency subcarrier associated with the RF channel. Values for the index p may represent a range of integer values as determined in equations [5] and [6]. The notation $\psi_{li}(f_p)$ may refer to a Givens rotation angle associated with frequency subcarrier $f_p$. The notation $\psi_{li}(f_p)$ may refer to a phase rotation angle associated with frequency subcarrier $f_p$.

TABLE 2

Exemplary encoding of explicit feedback information

| Feedback Bits | Angle Reported |
|---|---|
| $b_1 \ldots b_5$ | $\Phi_{21}(f_{-28})$ |
| $b_6 \ldots b_{10}$ | $\Phi_{21}(f_{-27})$ |
| ... | ... |
| $b_{276} \ldots b_{280}$ | $\Phi_{21}(f_{28})$ |
| $b_{281} \ldots b_{283}$ | $\psi_{21}(f_{-28})$ |
| $b_{284} \ldots b_{286}$ | $\psi_{21}(f_{-27})$ |
| ... | ... |
| $b_{446} \ldots b_{448}$ | $\psi_{21}(f_{28})$ |

The exemplary explicit feedback information shown in Table 2 contains 448 bits: 168 bits may be utilized to communicate Givens rotation angles, and 280 bits may be utilized to communicate phase rotation angles.

Table 3 presents exemplary comparisons between the number of bytes contained in explicit feedback information, which is generated in accordance with an embodiment of the invention, and a corresponding number of bytes contained in explicit feedback information such that the PER performance may be within about 0.5 dB of the full resolution, or true values for Givens and/or phase rotation angles, PER performance for beamforming, which is generated based on a Cartesian coordinate format representation. The comparison in Table 3 may be based on a 20 MHz type E RF channel as specified in IEEE 802.11. The first row in Table 3 represents a number of bytes contained in explicit feedback information, which is generated based on a Cartesian coordinate format representation. The second row in Table 3 represents a number of bytes contained in explicit feedback information such that the PER performance may be within about 0.5 dB of the full resolution, or true values for Givens and/or phase rotation angles, PER performance for beamforming, which is generated based on Givens rotations in accordance with an embodiment of the invention. The first column in Table 3 represents a size of a V matrix where N=2 and M=2. The second column in Table 3 represents a size of a V matrix where N=3 and M=3. The third column in Table 3 represents a size of a V matrix where N=4 and M=2. The fourth column in Table 3 represents a size of a V matrix where N=4 and M=4.

When N=2 and M=2, the Cartesian coordinate format representation, indicated in the first row of Table 3, may be utilized to report 4 sets of I and Q amplitude component values in explicit feedback information where each set comprises I and Q amplitude component values associated with each frequency subcarrier associated with the 20 MHz RF channel. The I and Q amplitudes may be quantized and represented in a 10 bit binary word, for example utilizing 4 bits to quantize each I amplitude and 6 bits to quantize each Q amplitude. The Cartesian coordinate format representation of the explicit feedback information may comprise 280 bytes. The Givens rotation version, indicated in the second row of Table 3, may be utilized to report one set of Givens rotation angles and phase rotation angles, as indicated in Table 1. The Givens rotation version may utilize 3 bits to quantize each Givens rotation angle and 5 bits to quantize each phase rotation angle, for example. The Givens rotation version of the explicit feedback information may comprise 56 bytes.

When N=3 and M=3, the Cartesian coordinate format representation may be utilized to report 9 sets of I and Q amplitude component values in explicit feedback information. The I and Q amplitudes may be quantized and represented in a 8 bit binary word, for example utilizing 3 bits to quantize each I amplitude and 5 bits to quantize each Q amplitude. The Cartesian coordinate format representation of the explicit feedback information may comprise 504 bytes. The Givens rotation version, indicated in the second row of Table 3, may be utilized to report 3 sets of Givens rotation angles and phase rotation angles as indicated in Table 1. The Givens rotation version may utilize 3 bits to quantize each Givens rotation angle and 5 bits to quantize each phase rotation angle, for example. The Givens rotation version of the explicit feedback information may comprise 168 bytes.

When N=4 and M=2, the Cartesian coordinate format representation may be utilized to report 8 sets of I and Q amplitude component values in explicit feedback information. The I and Q amplitudes may be quantized and represented in a 8 bit binary word, for example utilizing 3 bits to quantize each I amplitude and 5 bits to quantize each Q amplitude. The Cartesian coordinate format representation of the explicit feedback information may comprise 448 bytes. The Givens rotation version, indicated in the second row of Table 3, may be utilized to report 5 sets of Givens rotation angles and phase rotation angles as indicated in Table 1. The Givens rotation version may utilize 2 bits to quantize each Givens rotation angle and 4 bits to quantize each phase rotation angle, for example. The Givens rotation version of the explicit feedback information may comprise 210 bytes.

When N=4 and M=4, the Cartesian coordinate format representation may be utilized to report 16 sets of I and Q amplitude component values in explicit feedback information. The I and Q amplitudes may be quantized and represented in a 8 bit binary word, for example utilizing 3 bits to quantize each I amplitude and 5 bits to quantize each Q amplitude. The Cartesian coordinate format representation of the explicit feedback information may comprise 896 bytes. The Givens rotation version, indicated in the second row of Table 3, may be utilized to report 6 sets of Givens rotation angles and phase rotation angles as indicated in Table 1. The Givens rotation version may utilize 3 bits to quantize each Givens rotation angle and 5 bits to quantize each phase rotation angle, for example. The Givens rotation version of the explicit feedback information may comprise 336 bytes. Alternatively, the Givens rotation version may utilize 2 bits to quantize each Givens rotation angle and 4 bits to quantize each phase rotation angle, for example. In this case, the Givens rotation version of the explicit feedback information may comprise 252 bytes.

TABLE 3

Quantity of Explicit Feedback Information for 20 MHz Type E Channel (Bytes)

|  | 2 × 2 | 3 × 3 | 4 × 2 | 4 × 4 |
|---|---|---|---|---|
| Cartesian | 280 | 504 | 448 | 896 |
| Givens | 56 | 168 | 210 | 336 (252) |

Table 4 presents exemplary comparisons between the number of bytes contained in explicit feedback information, which is generated in accordance with an embodiment of the invention, and a corresponding number of bytes contained in explicit feedback information such that the PER performance may be within about 0.5 dB of the full resolution, or true values for Givens and/or phase rotation angles, PER performance for beamforming, which is generated based on a Cartesian coordinate format representation. Table 4 represents equivalent information from Table 3 where the RF channel is 40 MHz. The comparison in Table 4 may be based on a 40 MHz type E RF channel as specified in IEEE 802.11. The first row in Table 4 represents a number of bytes contained in explicit feedback information, which is generated based on a Cartesian coordinate format representation. The second row in Table 4 represents a number of bytes contained in explicit feedback information such that the PER performance may be within about 0.5 dB of the full resolution, or true values for Givens and/or phase rotation angles, PER performance for beamforming, which is generated based on Givens rotations in accordance with an embodiment of the invention. The first column in Table 4 represents a size of a V matrix where N=2 and M=2. The second column in Table 4 represents a size of a V matrix where N=3 and M=3. The third column in Table 4 represents a size of a V matrix where N=4 and M=2. The fourth column in Table 4 represents a size of a V matrix where N=4 and M=4.

TABLE 4

Quantity of Explicit Feedback Information for 40 MHz Type E Channel (Bytes)

|  | 2 × 2 | 3 × 3 | 4 × 2 | 4 × 4 |
|---|---|---|---|---|
| Cartesian | 570 | 1,026 | 912 | 1,824 |
| Givens | 114 | 342 | 428 | 684 (513) |

Figure 5:
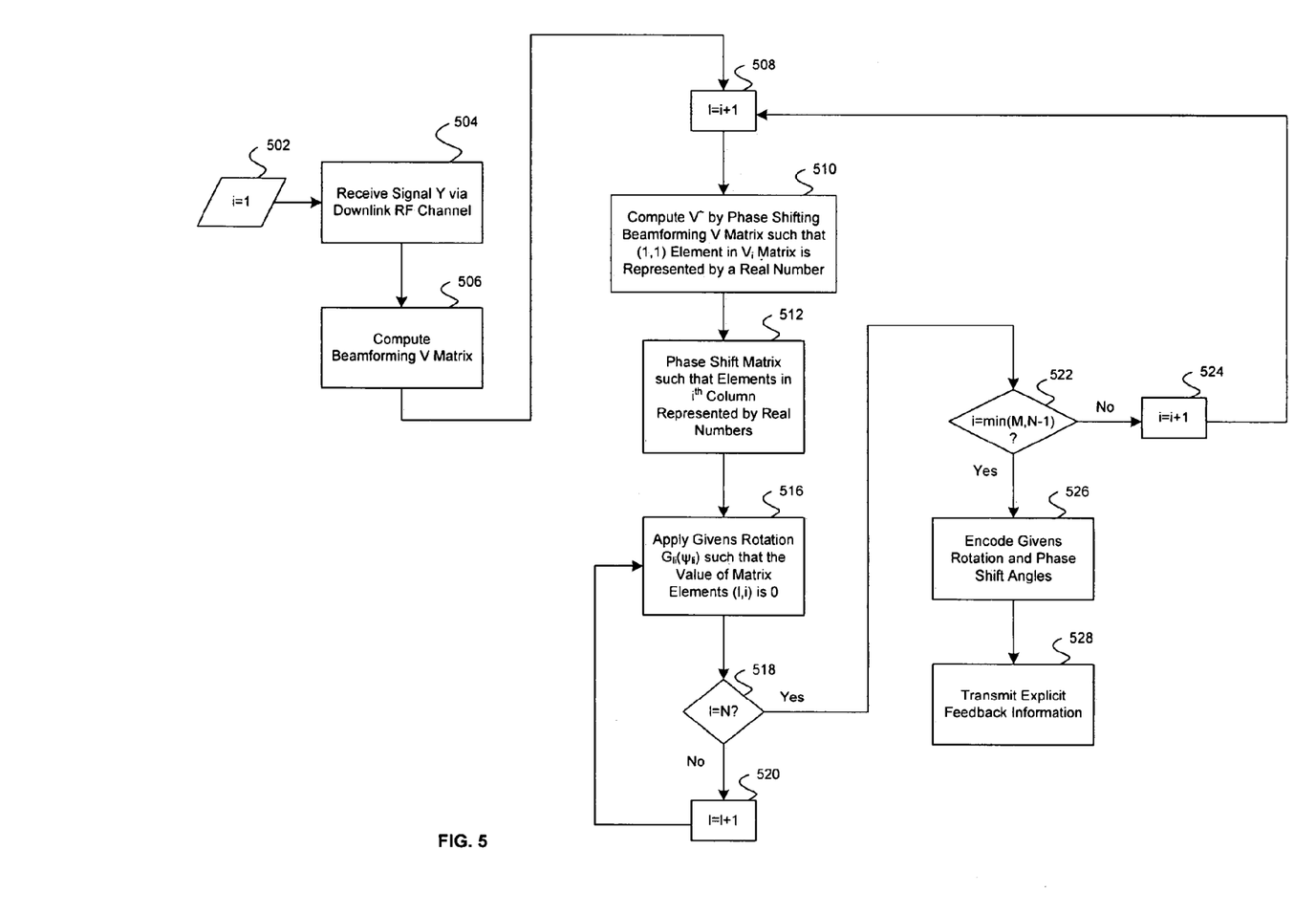
FIG. 5 is a flowchart illustrating exemplary steps for utilizing Givens rotations for beamforming matrices in explicit feedback information, in accordance with an embodiment of the invention

FIG. 5 is a flowchart illustrating exemplary steps for utilizing Givens rotations for beamforming matrices in explicit feedback information, in accordance with an embodiment of the invention. Referring to FIG. 5, is step 502 a column counter, i, may be initialized to a value of 1. In step 504, a signal Y, which was transmitted by a WLAN station 106, may be received by a WLAN station 104 via a downlink RF channel. In step 506 the receiving WLAN station 104 may compute a beamforming V matrix. The V matrix may comprise N rows and M columns.

In step 508, a row counter, I, may be initialize to a value based on the current value of the row counter i. In step 510, a residual matrix $\tilde{V}$ may be computed by phase shifting the beamforming V matrix such that the (1,1) element in the $V_i$ matrix may be represented a real number. In step 512, a current residual matrix may be phase shifted such that elements in the $i^{th}$ column may be represented by real numbers. In step 516, a Givens rotation may be applied such that the value of the element (l,i) is about 0 in the Givens rotated matrix. Step 518 may determine if the current value of the row counter is equal to the value N. If the current value of the row counter is not equal to the value N, in step 520, the value of the row counter may be incremented. Step 516 may follow step 520. If the current value of the row counter is equal to the value N, step 522 may determine if the current value of the column counter is about equal to the value of the expression min(M,N−1). If the current value of the column counter is not approximately equal to the value of the expression min(M, N−1), step 524 may increment the value of the column counter. Step 508 may follow step 524. If the current value of the column counter is about equal to the value of the expression min(M,N−1), in step 526, values for Givens rotation angles and phase rotation angles may be encoded. The values of the angles may be quantized and encoded based on a codebook, for example. In step 528, explicit feedback information may be transmitted from the WLAN station 104 to the WLAN station 106 via an uplink RF channel.

Aspects of a system for processing signals in a communication system may comprise a processor 282 that enables computation of a beamforming matrix for a signal received from a transmitter 302 in a MIMO communication system. The processor 282 may enable rotation, at a receiver 322 in the MIMO communication system, of components of a residual matrix generated from the computed beamforming matrix utilizing a Givens rotation. The processor 282 may enable a feeding back of information resulting from the rotation to the transmitter 302 in the MIMO communication system.

The processor 282 may enable a phase shifting of the computed beamforming matrix to generate the residual matrix. The phase shifting may be done such that elements in an $i^{th}$ column of the residual matrix may be represented by at least one real number. The processor 282 may enable a rotation of the phase shifted residual matrix to generate a subsequent residual matrix based on the Givens rotation such that a value of an element in an $l^{th}$ row in the $i^{th}$ column is about equal to 0.

The Givens rotation may utilize a Givens (l, i) matrix as described in equation [12], for example. A value of an element in an $l^{th}$ row and in the $l^{th}$ column may be about equal to $\cos(\psi_{li})$. A value of an element in the $l^{th}$ row and in the $i^{th}$ column may be about equal to $-\sin(\psi_{li})$. A value of an element in the $i^{th}$ row and in the $l^{th}$ column may be about equal to $\sin(\psi_{li})$. A value of an element in the $i^{th}$ row and in the $i^{th}$ column may be about equal to $\cos(\psi_{li})$. A value for a corresponding rotation angle $\psi_{li}$ may be based on l and i. The value for l may be greater than the value for i.

The processor 282 may enable a rotation of the subsequent residual matrix based on one or more subsequent Givens rotations and/or one or more subsequent phase shifting. The subsequent shifting may be done such that elements in an $m^{th}$ column of the subsequent residual matrix are represented by at least on real number. The processor 282 may enable a rotation of the subsequent phase shifted subsequent residual matrix based on the subsequent Givens rotation such that a value of an element in an $n^{th}$ row and in the $m^{th}$ column is about equal to 0.

The subsequent Givens rotation may utilize a Givens (n, m) matrix. A value of an element in an $n^{th}$ row and in the $n^{th}$ column may be about equal to $\cos(\psi_{nm})$. A value of an element in the $n^{th}$ row and in the $m^{th}$ column may be about equal to $-\sin(\psi_{nm})$. A value of an element in the $m^{th}$ row and in the $n^{th}$ column may be about equal to $\sin(\psi_{nm})$. A value of an element in the $m^{th}$ row and in the $m^{th}$ column may be about equal to $\cos(\psi_{nm})$. A value for a corresponding rotation angle $\psi_{nm}$ may be based on n and m. The value for n may be greater than the value for m.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a MIMO communication system, the method comprising:
   in a transmitter in the MIMO communication system:
      receiving feedback information from a receiver in said MIMO communication system via an uplink RF channel, the feedback information including feedback angles representing a beamforming matrix computed by the receiver for a downlink RF channel, the feedback angles including at least one phase shift angle and at least one Givens rotation angle;
      reconstructing the beamforming matrix using the feedback angles; and
      utilizing the beamforming matrix for communications with the receiver on the downlink RF channel.

2. The method of claim 1, wherein said at least one phase shift angle represents a phase shift of the beamforming matrix such that elements in an $i^{th}$ column of a residual matrix produced from phase shifting the beamforming matrix are represented by at least one real number.

3. The method of claim 2, wherein said at least one phase shift angle further represents a phase shift of the residual matrix such that, based on said at least one Givens rotation angle, a value of an element in an $l^{th}$ row and in said $i^{th}$ column of a subsequent residual matrix is equal to 0.

4. The method of claim 3, wherein said Givens rotation angle represents a Givens (l, i) matrix:
   wherein a value of an element in an $l^{th}$ row and in said $l^{th}$ column is equal to $\cos(\psi_{lj})$;
   wherein a value of an element in said $l^{th}$ row and in said $i^{th}$ column is equal to $-\sin(\psi_{li})$;
   wherein a value of an element in said $i_{th}$ row and in said $l_{th}$ column is equal to $\sin(\psi_{li})$;
   wherein a value of an element in said $i_{th}$ row and in said $i_{th}$ column is equal to $\cos(\psi_{li})$;
   wherein cos( ) represents a cosine trigonometric function, sin( ) represents a sine trigonometric function, and $\psi_{li}$ represents said Givens rotation angle based on said one or both of said l and said i.

5. The method of claim 4, wherein said feedback information further includes one or both of an additional Givens rotation angle and an additional phase shift angle.

6. The method of claim 5, wherein said additional phase shift angle represents a phase shift of the subsequent residual matrix such that elements in an $m^{th}$ column of an additional residual matrix are represented by at least one real number.

7. The method of claim 6, wherein said additional Givens rotation angle represents a rotation of said additional residual matrix such that a value of an element in an nth row and in said $m^{th}$ column is equal to 0.

8. The method of claim 7, wherein said additional Givens rotation utilizes a Givens (n, m) matrix:
   wherein a value of an element in an $n^{th}$ row and in said $n^{th}$ column is equal to $\cos(\psi_{nm})$;
   wherein a value of an element in an nth row and in said $m^{th}$ column is equal to $-\sin(\psi_{nm})$;
   wherein a value of an element in an $m^{th}$ row and in said $n^{th}$ column is equal to $\sin(\psi_{nm})$;
   wherein a value of an element in an $m^{th}$ row and in said $m^{th}$ column is equal to $\cos(\psi_{nm})$
   wherein cos( ) represents a cosine trigonometric function, sin( ) represents a sine trigonometric function, and $\psi_{nm}$ represents a value for said additional Givens rotation angle based on said one or both of said n and said m.

9. The method of claim 1, wherein said reconstructing further includes:
using an order of said feedback angles to determine an order of multiplications performed to reconstruct the beamforming matrix.

10. The method of claim 1, wherein said feedback angles are vectors representing values for each subcarrier on the downlink RF channel.

11. A transmitter for use in a MIMO communication system, the transmitter comprising:
a processor, wherein:
said processor is operable to receive feedback information from a receiver in said MIMO communication system via an uplink RF channel, the feedback information including feedback angles representing a beamforming matrix computed by the receiver for a downlink RF channel, the feedback angles including at least one phase shift angle and at least one Givens rotation angle;
said processor is operable to reconstruct the beamforming matrix using the feedback angles; and
said processor is operable to enable the beamforming matrix to be utilized for communications with the receiver on the downlink RF channel.

12. The transmitter of claim 11, wherein said at least one phase shift angle represents a phase shift of the beamforming matrix such that elements in an $i^{th}$ column of a residual matrix produced from phase shifting the beamforming matrix are represented by at least one real number.

13. The transmitter of claim 12, wherein said at least one phase shift angle further represents a phase shift of the residual matrix such that, based on said at least one Givens rotation angle, a value of an element in an $l^{th}$ row and in said $i^{th}$ column of a subsequent residual matrix is equal to 0.

14. The transmitter of claim 13, wherein said Givens rotation angle represents a Givens (l, i) matrix:
wherein a value of an element in an $l^{th}$ row and in said $l^{th}$ column is equal to $\cos(\psi_{ij})$
wherein a value of an element in said $l^{th}$ row and in said $i^{th}$ column is equal to $-\sin(\psi_{li})$;
wherein a value of an element in said $i_{th}$ row and in said $l_{th}$ column is equal to $\sin(\psi_{ij})$;
wherein a value of an element in said $i_{th}$ row and in said $i_{th}$ column is equal to $\cos(\psi_{li})$;
wherein $\cos(\ )$ represents a cosine trigonometric function, $\sin(\ )$ represents a sine trigonometric function, and $\psi_{li}$ represents said Givens rotation angle based on said one or both of said l and said i.

15. The transmitter of claim 14, wherein said feedback information further includes one or both of an additional Givens rotation angle and an additional phase shift angle.

16. The transmitter of claim 15, wherein said additional phase shift angle represents a phase shift of the subsequent residual matrix such that elements in an $m^{th}$ column of an additional residual matrix are represented by at least one real number.

17. The transmitter of claim 16, wherein said additional Givens rotation angle represents a rotation of said additional residual matrix such that a value of an element in an nth row and in said $m^{th}$ column is equal to 0.

18. The transmitter of claim 17, wherein said additional Givens rotation utilizes a Givens (n, m) matrix:
wherein a value of an element in an $n^{th}$ row and in said $n^{th}$ column is equal to $\cos(\psi_{nm})$;
wherein a value of an element in an nth row and in said $m^{th}$ column is equal to $-\sin(\psi_{nm})$;
wherein a value of an element in an $m^{th}$ row and in said $n^{th}$ column is equal to $\sin(\psi_{nm})$;
wherein a value of an element in an $m^{th}$ row and in said $m^{th}$ column is equal to $\cos(\psi_{nm})$
wherein $\cos(\ )$ represents a cosine trigonometric function, $\sin(\ )$ represents a sine trigonometric function, and $\psi_{nm}$ represents a value for said additional Givens rotation angle based on said one or both of said n and said m.

19. The transmitter of claim 11, wherein said processor is further operable to use an order of said feedback angles to determine an order of multiplications to be performed to reconstruct the beamforming matrix.

20. The transmitter of claim 11, wherein said feedback angles are vectors representing values for each subcarrier on the downlink RF channel.

* * * * *